United States Patent
Cutaia et al.

(10) Patent No.: US 11,949,968 B2
(45) Date of Patent: Apr. 2, 2024

(54) SYSTEMS AND METHODS FOR INTERACTIVE LIVE VIDEO STREAMING

(71) Applicant: SW Direct Sales, LLC, San Antonio, TX (US)

(72) Inventors: Rory J. Cutaia, Newport Beach, CA (US); Chad Thomas, Ladera Ranch, CA (US); Jason R. Matheny, Highland, UT (US); Brycen Rinehart, Newport Beach, CA (US); Robert Roy Hall, Jr., Newport Beach, CA (US)

(73) Assignee: SW Direct Sales, LLC, San Antonio, TX (US)

( * ) Notice: Subject to any disclaimer, the term of this patent is extended or adjusted under 35 U.S.C. 154(b) by 0 days.

(21) Appl. No.: 17/098,200

(22) Filed: Nov. 13, 2020

(65) Prior Publication Data

US 2021/0144452 A1 May 13, 2021

Related U.S. Application Data (60) Provisional application No. 62/935,042, filed on Nov. 13, 2019.

(51) Int. Cl.
*H04N 21/8545* (2011.01)
*H04N 21/2187* (2011.01)
(Continued)

(52) U.S. Cl.
CPC ..... *H04N 21/8545* (2013.01); *H04N 21/2187* (2013.01); *H04N 21/47815* (2013.01); *H04N 21/8456* (2013.01)

(58) Field of Classification Search
None
See application file for complete search history.

(56) References Cited

U.S. PATENT DOCUMENTS 8,458,053 B1 * 6/2013 Buron ............... H04N 21/4316
705/26.1
10,747,948 B1 * 8/2020 Petrov ............... H04N 21/4532
(Continued)

FOREIGN PATENT DOCUMENTS

BR 1120220093705 A2 9/2022
CN 115039174 A 9/2022
(Continued)

OTHER PUBLICATIONS

International Search Report and Written Opinion for International Application No. PCT/US2020/060591, Search completed Dec. 28, 2020, dated Feb. 12 2021, 17 Pgs.
(Continued)

*Primary Examiner* — Alexander Q Huerta
(74) *Attorney, Agent, or Firm* — KPPB LLP (57) ABSTRACT

Systems and methods for interactive live video streaming in accordance with embodiments of the invention are illustrated. One embodiment includes an interaction encoder for transmitting interactive live video streams, including a processor, and a memory, containing an interaction encoding application, where the interaction encoding application directs the processor to obtain media data comprising a video track, receive a request to generate an interaction object in the video track at a given timestamp of the video stream, generate interaction data based on the request, where the interaction data includes a data structure capable of being decoded in near-real time to produce the interaction object in the video track at the timestamp when played back, and transmit the interaction data to an interaction decoder.

19 Claims, 11 Drawing Sheets

(51) Int. Cl.
H04N 21/478 (2011.01)
H04N 21/845 (2011.01)

(56) References Cited

U.S. PATENT DOCUMENTS

| | | | | |
|---|---|---|---|---|
| 2006/0195887 | A1* | 8/2006 | Shusman | H04N 21/8541 |
| | | | | 725/138 |
| 2007/0245243 | A1* | 10/2007 | Lanza | H04N 21/4788 |
| | | | | 715/723 |
| 2009/0276805 | A1* | 11/2009 | Andrews, II | G06F 3/0482 |
| | | | | 725/35 |
| 2010/0037149 | A1* | 2/2010 | Heath | G06F 3/0481 |
| | | | | 715/753 |
| 2011/0214143 | A1* | 9/2011 | Rits | H04N 21/8586 |
| | | | | 725/34 |
| 2013/0145269 | A1* | 6/2013 | Latulipe | G06F 3/04847 |
| | | | | 715/720 |
| 2015/0355826 | A1 | 12/2015 | Gibbons et al. | |
| 2016/0173961 | A1* | 6/2016 | Coan | H04N 21/8456 |
| | | | | 725/32 |
| 2017/0099521 | A1 | 4/2017 | Sirpal et al. | |
| 2017/0251261 | A1* | 8/2017 | James | H04N 21/2347 |
| 2018/0027298 | A1* | 1/2018 | Paglia | H04N 21/2668 |
| | | | | 725/37 |
| 2018/0103298 | A1 | 4/2018 | Taylor et al. | |
| 2018/0152764 | A1* | 5/2018 | Taylor | G06Q 30/0623 |
| 2019/0075340 | A1* | 3/2019 | Hochart | H04N 21/4532 |
| 2019/0141368 | A1* | 5/2019 | Loheide | H04N 21/23439 |
| 2019/0146951 | A1* | 5/2019 | Velmurugan | H04N 21/84 |
| | | | | 707/822 |
| 2019/0207924 | A1* | 7/2019 | Ross | H04N 21/00 |
| 2019/0342599 | A1* | 11/2019 | Almeida | H04N 21/4316 |
| 2020/0068232 | A1* | 2/2020 | Lipczynski | H04N 21/25883 |
| 2020/0413163 | A1* | 12/2020 | Aher | H04N 21/8545 |

FOREIGN PATENT DOCUMENTS

| | | |
|---|---|---|
| EP | 4059014 A1 | 9/2022 |
| JP | 2023502973 A | 1/2023 |
| WO | 2021097355 A1 | 5/2021 |

OTHER PUBLICATIONS

International Preliminary Report on Patentability for International Application PCT/US2020/060591, Report dated May 17, 2022, dated May 27, 2022, 8 Pgs.

* cited by examiner

```
{
  "schema_version": 3,
  "interactions": [
    {
      "attributes": {
        "action": "https://www.aol.com/",
        "label": "AOL Link"
      },
      "center_x": 141.44934612771738,
      "center_y": 995.7939678404976,
      "end": 98.7,
      "height_max": 150,
      "height_pc": 10,
      "interaction_id": "5448CCA2-5C61-4968-8E2A-86E29ECE1888",
      "interaction_type": "link",
      "rotation_angle": 1.5708,
      "start": 0,
      "style": {
        "button_style": "icon",
        "color": {
          "background": "#ffffff"
        },
        "opacity": 0.2,
        "pulse_animation": true,
        "style_type": "button"
      },
      "width_max": 150,
      "width_pc": 10
    }
  ]
}
```

SYSTEMS AND METHODS FOR INTERACTIVE LIVE VIDEO STREAMING

CROSS-REFERENCE TO RELATED APPLICATIONS

The current application claims the benefit of and priority under 35 U.S.C. § 119(e) to U.S. Provisional Patent Application No. 62/935,042 entitled "Systems and Methods for Embedding Interactive Objects in Live Streaming Video" filed No. 13, 2019. The disclosure of U.S. Provisional Patent Application No. 62/935,042 is hereby incorporated by reference in its entirety for all purposes.

FIELD OF THE INVENTION

The present invention generally relates to enabling interactive video streaming, and namely to providing real-time interactive objects in a live video feed.

BACKGROUND

Video streaming is a now ubiquitous technology that enables audio/video media playback easily on many devices. Live video streaming is a type of video streaming which refers to online streaming media simultaneously recorded and broadcast in real time. Video can be live streamed by a host to many users each using different types of devices. Some video streaming players are web-based and enable playback in a browser window.

Customer relationship management (CRM) software is a type of software that is used to manage customer relationships and sales leads.

SUMMARY OF THE INVENTION

Systems and methods for interactive live video streaming in accordance with embodiments of the invention are illustrated. One embodiment includes an interaction encoder for transmitting interactive live video streams, including a processor, and a memory, containing an interaction encoding application, where the interaction encoding application directs the processor to obtain media data comprising a video track, receive a request to generate an interaction object in the video track at a given timestamp of the video stream, generate interaction data based on the request, where the interaction data includes a data structure capable of being decoded in near-real time to produce the interaction object in the video track at the timestamp when played back, and transmit the interaction data to an interaction decoder.

In another embodiment, the interaction encoding application further directs the processor to store the interaction data in an interaction track.

In a further embodiment, the interaction encoding application further directs the processor to generate a manifest, the manifest describing the location of the interaction track and the video track.

In still another embodiment, the media data further includes an audio track, and the interaction encoding application further directs the processor to transmit the media data.

In a still further embodiment, the interaction encoding application further directs the processor to provide an interaction user interface, where the interaction user interface includes an interaction pane, and where the interaction pane includes a plurality of selectable buttons which, when pressed, generate the request to generate an interaction object.

In yet another embodiment, the data structure is a JavaScript Object Notation (JSON) object comprising variables describing at least coordinates of the interaction object, a timestamp at which to render the interaction object, and a link to be executed by a web browser when the interaction object is interacted with.

In a yet further embodiment, the interaction encoding application further directs the processor to track the motion of an object in the video track, and update the interaction data to reflect the tracked motion such that a location of the interaction object follows the tracked motion to create a "pin" effect.

In another additional embodiment, an interaction decoder for displaying interactive live video streams includes a processor, and a memory, comprising an interaction decoding application, where the interaction decoding application directs the processor to receive media data comprising a video track, receive interaction data comprising at least one data structure describing an interaction object, render the video track using a video player, generate an interaction pane, where the interaction pane is transparent and overlays the video player, render the interaction object in the interaction pane using the data structure at a time and location indicated by the data structure, and displaying, in response to selection of the interactable object, an interaction effect indicated by the data structure.

In a further additional embodiment, the interaction effect is selected from the group consisting of a phone call effect, an email effect, a buy now effect, a schedule effect, a social effect, and a link effect.

In another embodiment again, the interaction decoding application further configures the processor to move the interaction object in the interaction pane based on reception of new interaction data.

In a further embodiment again, the interaction effect is a "buy now" effect, and the interaction decoding application further directs the processor to request a purchasing interface via an API from an e-commerce vendor.

In still yet another embodiment, the interaction decoding application further directs the processor to record interactions with the interactable object, and transmit the record of the interactions to an interaction encoder.

In a still yet further embodiment, the interaction decoding application further directs the processor to receive a referral code, and transmit the referral code with the record of interactions.

In still another additional embodiment, the record of the interactions includes purchase records.

In a still further additional embodiment, an interactive live streaming video system includes an interaction encoder, where the interaction encoder is capable of transmitting a live video stream, receiving a request to display an interactive object over the live video stream, generating interaction data comprising a data object describing the interactive object, and transmitting the interaction data, and an interaction decoder, where the interaction decoder is capable of receiving the interaction data and the live video stream, playing back the live video stream in a video player, generating a transparent interaction pane over the video player, and rendering the interactive object in the interaction pane such that the interactive object appears to be in the live video stream.

In still another embodiment again, the interaction decoder is further capable of recording interactions made in the interaction pane, and transmitting the recorded interactions to the interaction encoder.

In a still further embodiment again, the data object is a JSON object.

In yet another additional embodiment, the interaction decoder is further capable of receiving a selection of the interactive object, and displaying an interaction effect in response to the selection.

In a yet further additional embodiment, the interaction effect is a "buy now" effect, and the interaction decoder is further capable of displaying a pane for purchasing a product, where the pane for purchasing a product is populated by accessing an API of an e-commerce provider selling the product.

In yet another embodiment again, the interaction decoder is further capable of receiving a referral code, and transmitting referral information to the interaction encoder based on the referral code.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Direct to consumer marketing has long been an effective sales tool. With the advent of television broadcasting, shopping channels, where a host presents a product over the air for consumers to view and dial in to purchase, became commonplace. Shopping channels mostly provide a bifurcated process whereby a consumer views the product on one device (e.g. their television) and orders via a second device (e.g. their phone or computer). While some television providers enable ordering directly through the TV, this remains a bifurcated process as the user generally needs to interact in a different pane of their TV or open an on-board app separate from the live stream.

With the rise of easily accessible live video streaming over the Internet, similar marketing opportunities have arisen in the e-commerce space. However, live Internet sales have largely remained a bifurcated process like home shopping. Conventional sales methodologies involving live video streaming tend to require that the actual purchase be made through a separate chat, an online storefront, or another browser tab of some fashion. Systems and methods described herein attempt to provide interactive live video streams which can enable purchases and/or any of a number of different interactions directly in a live streaming video player. Interactions can enable a higher degree of engagement in the video stream and yield a more streamlined purchasing process for the consumer. However, the interactivity enabled by systems and methods described herein is not limited to sales. The interactions provided can be made to execute any number of different functionalities as appropriate to the requirements of specific applications of embodiments of the invention. Further, as can readily be appreciated, while the below is discussed in the context of live video streaming, similar systems and methods can be used in pre-recorded video without departing from the scope or spirit of the invention. To begin, systems for interactive live video streaming are discussed below.

Interactive Live Video Systems

Interactive live video systems utilize an interaction encoder which generates an interactive stream which is then transmitted to interaction decoders which can ingest the interactive stream, provide it to a viewer, and process any resulting interactions. In many embodiments, interaction encoders and interaction decoders can be implemented using any of a number of different devices such as, but not limited to, personal computers, smartphones, laptops, tablet computers, and/or any other computing device capable of running interaction encoding and/or decoding processes.

Figure 1:
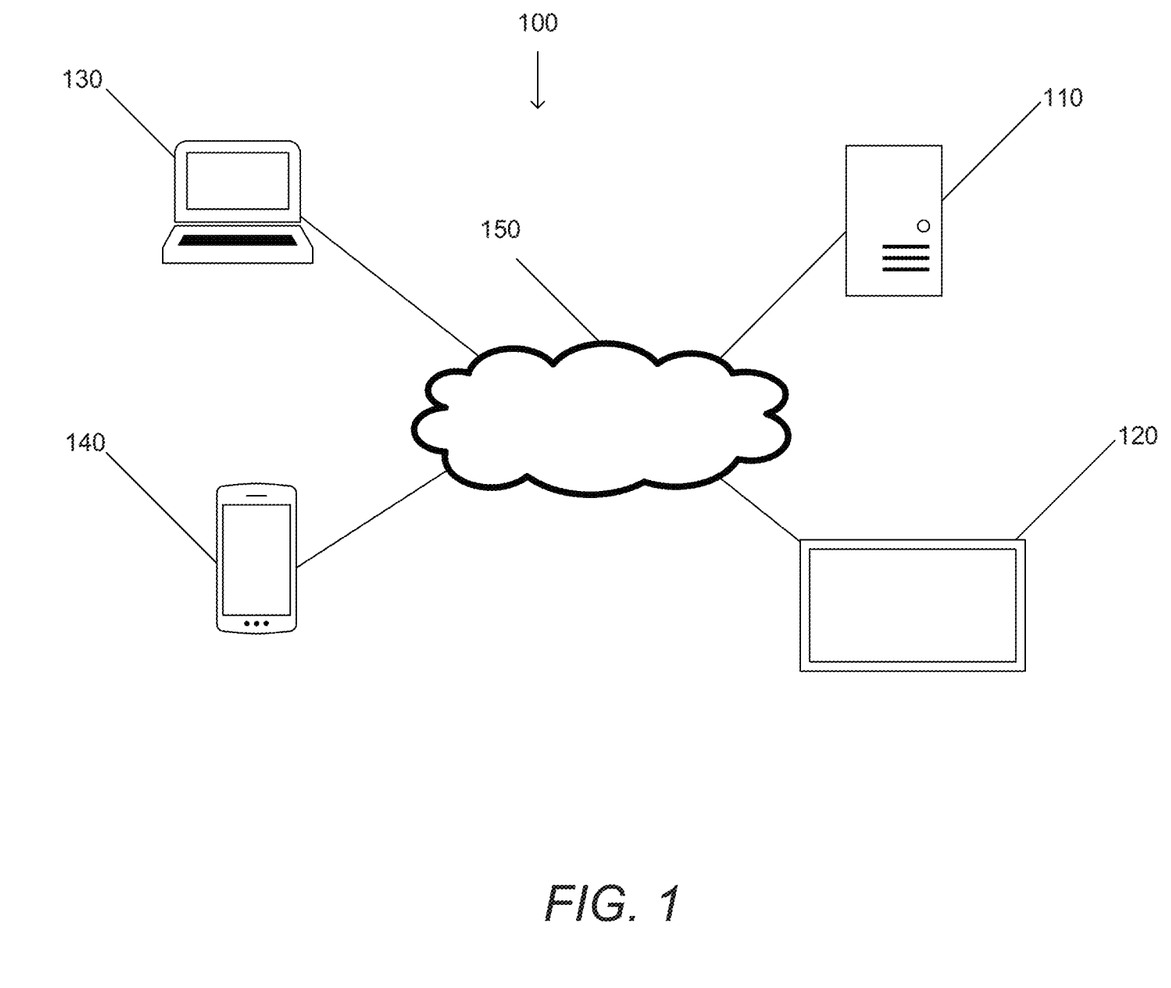
FIG. 1 illustrates an interactive live video streaming system in accordance with an embodiment of the invention.

Turning now to FIG. 1, an interactive live video system in accordance with an embodiment of the invention is illustrated. System 100 includes an interaction encoder 110. As in the illustrated embodiment, in many embodiments the interaction encoder is a personal computer. In various embodiments, the interaction encoder may be a server or server network which is accessed via a personal computer or any other computing device (e.g. a smartphone, a tablet PC, etc.) The system 100 further includes interaction decoders such as (but not limited to) smart TV 120, laptop 130, and smartphone 140. Indeed, interaction decoders can be implemented using any number of different computing hardware platforms, and multiple different interaction decoders implemented using different computing hardware platforms can receive and decode the same interaction data. Data is transferred between the interaction encoder 110 and the interaction decoders 120, 130, and 140 via a network 150. In many embodiments, the network is the Internet. In various embodiments, the network includes many sub-networks such as, but not limited to, intranets, local area networks, wide area networks, the Internet, and/or any other network as appropriate to the requirements of specific applications of embodiments of the invention. In numerous embodiments, interactive live video systems further include customer relationship management (CRM) systems capable of recording interactions that specific users perform.

Figure 2:
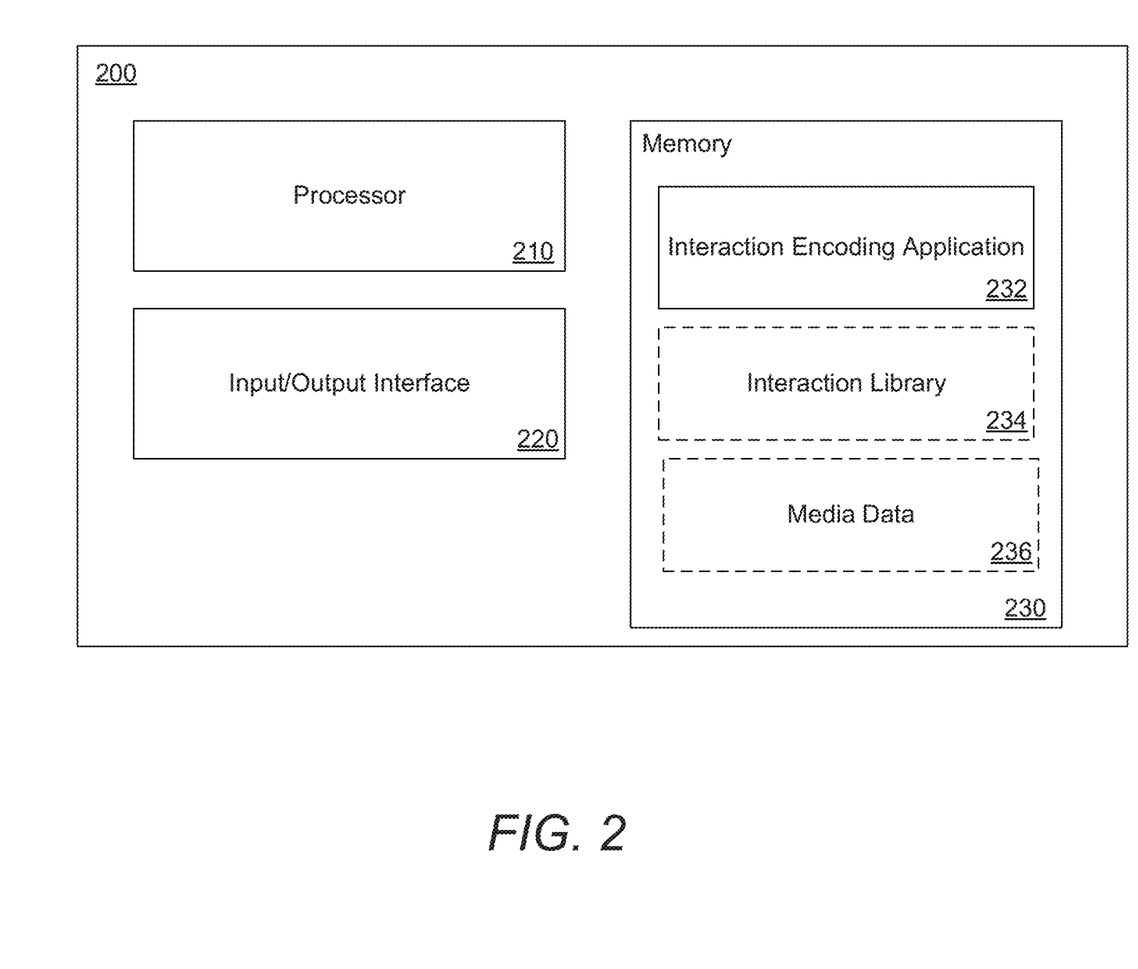
FIG. 2 is a block diagram for an interaction encoder in accordance with an embodiment of the invention.

Interaction encoders are computing devices capable of generating interaction data based on user commands, where the interaction data can be used by an interaction decoder to render interactions in video. As noted above, interaction encoders can be implemented using any number of different computing architectures. Turning now to FIG. 2, an interaction encoder in accordance with an embodiment of the invention is illustrated.

Interaction encoder 200 includes a processor 210. In many embodiments, more than one processor is used. Processors can be implemented using any number of different logic processing circuits including (but not limited to) central processing units (CPUs), graphics processing units (GPUs), field programmable gate arrays (FPGAs), application specific integrated circuits (ASICs), and/or any other circuit as appropriate to the requirements of specific applications of embodiments of the invention. The interaction encoder further includes an input/output (I/O) interface 220. I/O interfaces are any connector capable of transmitting and/or receiving data between the interaction encoder and interaction decoders. In some embodiments, the I/O interface enables connection to the Internet. In many embodiments, more than one I/O interface is used. In various embodiments, I/O interfaces can connect to devices used by a user to input commands.

The interaction encoder 200 further includes a memory 230. The memory 230 can be volatile memory, non-volatile memory, or any combination thereof. The memory 230 stores an interaction encoding application 232. Interaction encoding applications are capable of instructing the processor to execute interaction encoding processes. In some embodiments, the memory 230 stores an interaction library 234. Interaction libraries are data structures that store data that describes different template interactions. In many embodiments, the template interactions are template JSON structures, or any other data structure format capable of describing an interaction. In various embodiments, the memory 230 stores media data 236. Media data is any data that describes audio and/or video content. Interaction data generated by the interaction encoder describes interactions that are presented along with the audio and/or video content. In various embodiments, interaction data includes JSON objects or other comparable data objects describing an interaction to be displayed at a given time at a given location in the played back media.

Figure 3:
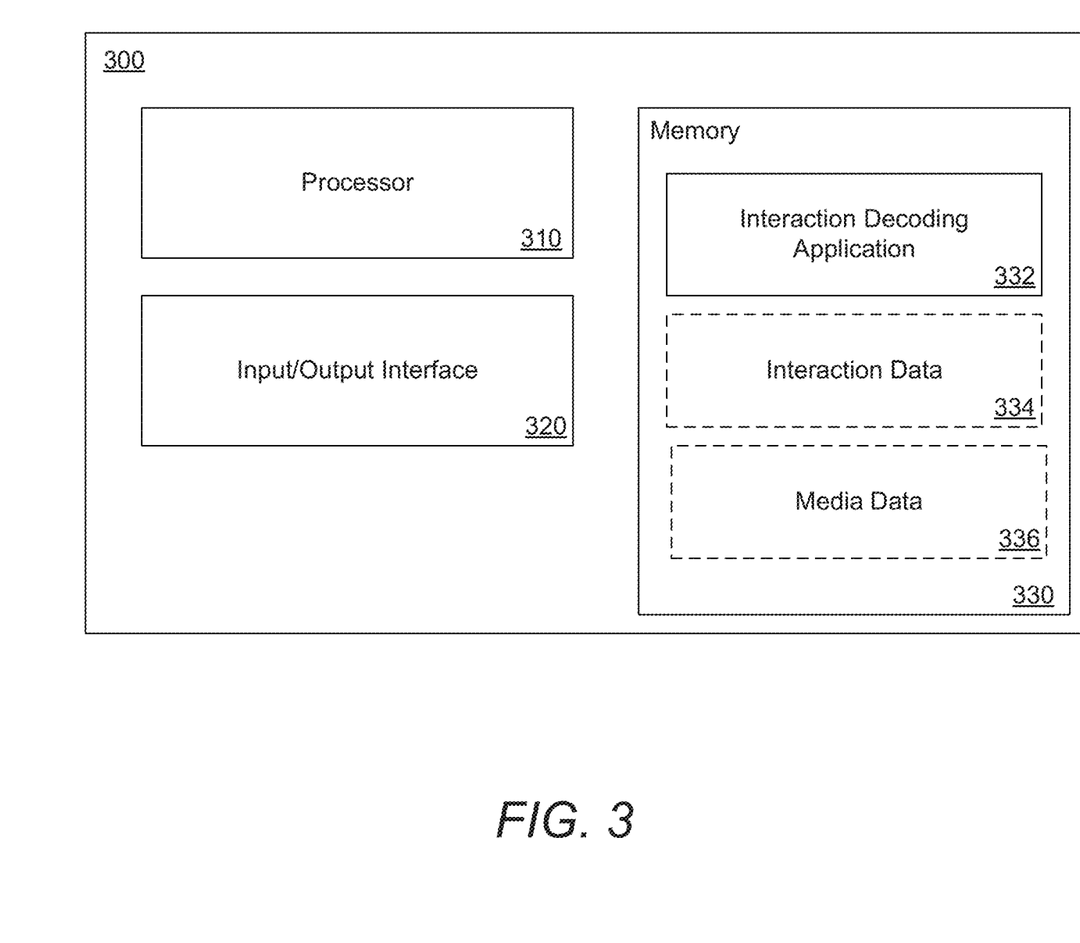
FIG. 3 is a block diagram for an interaction decoder in accordance with an embodiment of the invention.

Interaction data is ingested by interaction decoders to enable interactive live video streams. Interaction decoders, like interaction encoders, can be implemented using any of a variety of hardware platforms, including distributed computing platforms (e.g. where a user interacts with a cloud-hosted application). An interaction decoder in accordance with an embodiment of the invention is illustrated in FIG. 3.

Interaction decoder 300 includes a processor 310. In many embodiments, more than one processor is used. Processors can be implemented using any number of different logic processing circuits including (but not limited to) central processing units (CPUs), graphics processing units (GPUs), field programmable gate arrays (FPGAs), application specific integrated circuits (ASICs), and/or any other circuit as appropriate to the requirements of specific applications of embodiments of the invention. The interaction decoder further includes an input/output (I/O) interface 320. I/O interfaces are any connector capable of receiving and/or transmitting data between the interaction decoder and interaction encoders. In some embodiments, the I/O interface enables connection to the Internet. In many embodiments, more than one I/O interface is used. In various embodiments, I/O interfaces can connect to devices used by a user to input commands.

The interaction decoder 300 further includes a memory 330. The memory 230 can be volatile memory, non-volatile memory, or any combination thereof. The memory 330 stores an interaction decoding application 332. Interaction decoding applications are capable of instructing the processor to execute interaction decoding processes. In some embodiments, the memory 330 stores interaction data 334. Interaction data can be received from an interaction encoder and used to generate interactable objects within a media stream. Media data 336 can also be stored in the memory 330. The media data can be obtained from the interaction encoder, or from a separate content delivery network (CDN) or other such content provider. Together, interaction encoders and interaction decoders provide a cohesive ecosystem which enables hosts to broadcast engaging, interactive streams, and gives viewers the capability to interact with the streams without disengaging from the stream itself. User interfaces for interaction encoders and content decoders are discussed below.

Interaction Encoder and Decoder Interfaces

Interaction encoders and interaction decoders can both provide interfaces to users. Interaction encoder interfaces provide "host" users with the ability to add, remove, place, move, and modify interactions in a live video stream. Interaction encoder interfaces can further provide additional functionality as appropriate to the requirements of specific applications of embodiments of the invention. For example, chat windows, video editing, and/or video streaming tools may be provided in addition to any other functionality needed. Interaction decoders provide an interface by which media can be played back in a media player along with interactions which take place within the pane of the media player. Similarly, interaction decoder interfaces can be augmented with any number of different functionalities as appropriate to the requirements of specific applications of embodiments of the invention.

Figure 4A:
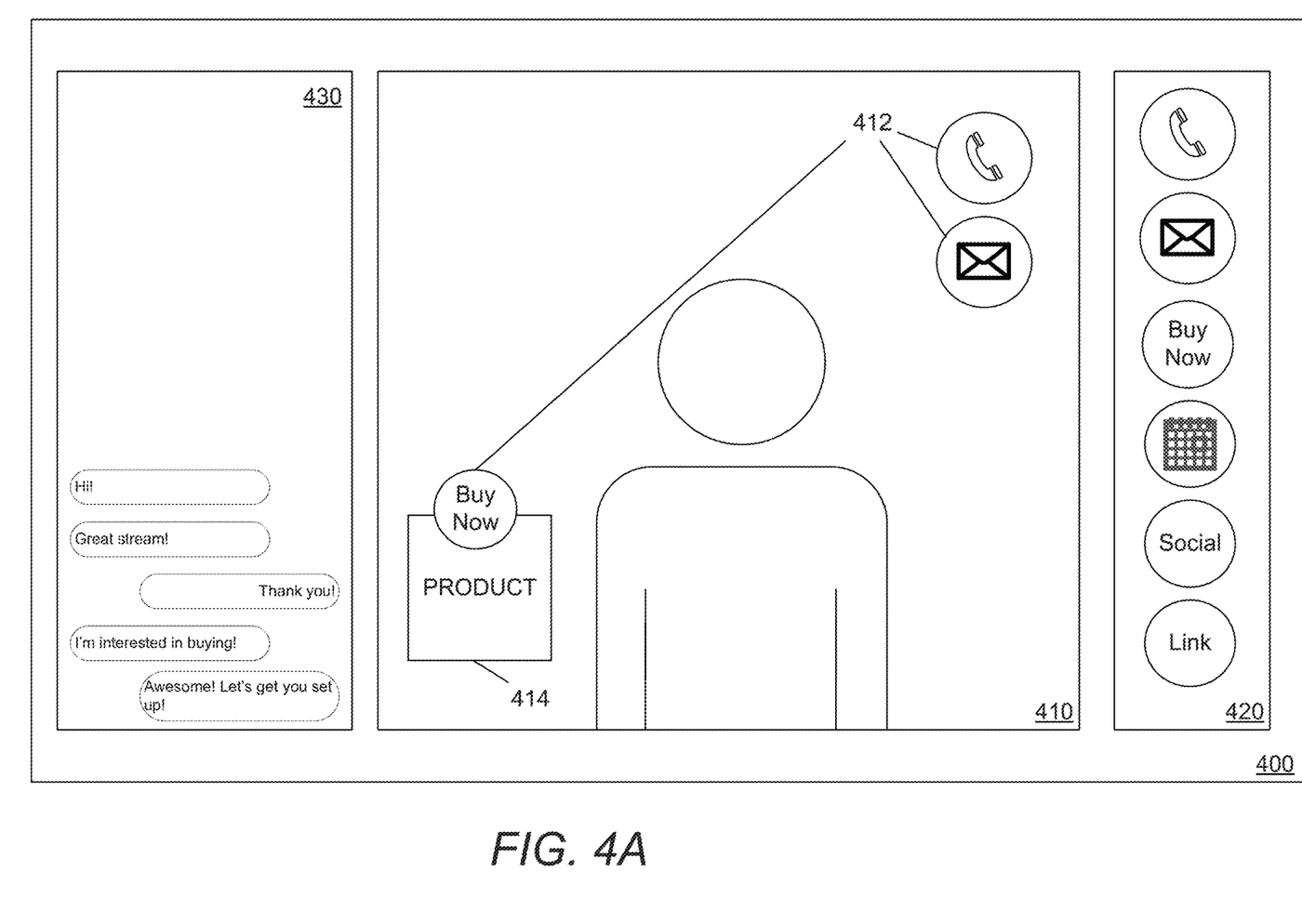
FIGS. 4A-C are example UI diagrams for an interaction encoder in accordance with an embodiment of the invention.

Turning now to FIG. 4A, an example interaction encoder interface in accordance with an embodiment of the invention is illustrated. The interaction encoder interface 400 includes a media pane 410. The media pane shows the currently streaming media in real time. The interface 400 further includes an interaction pane 420. The interaction pane includes a number of template interaction objects which can be selected by the user to generate and introduce an interaction effect (or simply "interaction") into the stream. Interactions include (but are not limited to): phone call object which can automatically dial a number or merely provide dial-in information, email object which can automatically open a pre-addressed email or merely provide a contact email address, a buy now object which immediately enables the user to buy a predetermined product without leaving the stream, a schedule object which can bring up a scheduling interface; a social object which links to any of a number of social media platforms, or a link object which can direct the user to a given link. As can be readily appreciated, any number of different interaction objects can be implemented without departing from the scope or spirit of the invention.

In the instant illustrated embodiment, three interactable objects 414 (a phone, email, and buy now object) have already been introduced into the stream. The buy now object has been pinned to a product which is being displayed by the host. In this context, "pinning" refers to behavior where if the product is moved through the pane, the buy now object will automatically follow it. Any object can be pinned to any set of pixels in the pane. In numerous embodiments, the pinning is performed automatically using motion tracking. However, objects do not need to be pinned to function. The product may be digitally introduced or physically present with the host. The interface 400 further includes a chat window 430 which can be used to chat with any number of people including (but not limited to) viewers.

Figure 4B:
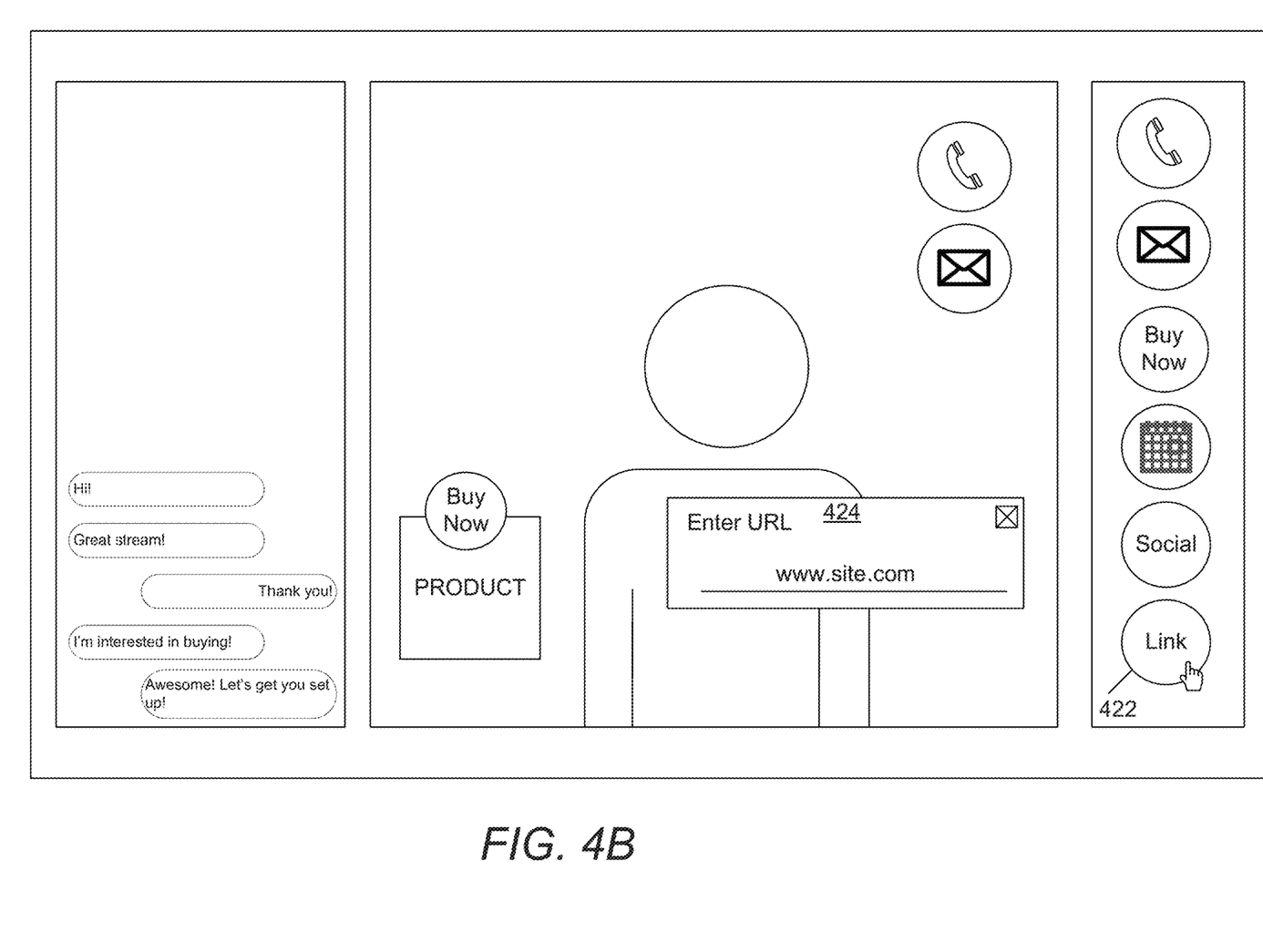

Turning now to FIG. 4B, the interaction encoder interface in accordance with an embodiment of the invention is again illustrated. At this point, a host has selected the link template object 422 which has opened an interaction editing window 424. The contents of the interaction editing window can be modified based on the template object selected. For example, when the link template object is selected, the interaction editing window can include a space for a URL to be entered. An email template object may yield a space for entering an email address, a phone template object may yield a space for entering a phone number, etc. In many embodiments, the interaction editing window can include options and parameters for controlling the visual or audible appearance of the object when rendered by an interaction decoder. For example, parameters can be provided for size, color, shape, text, animations, motion, timing for when the object should be displayed, and/or any other parameter as appropriate to the requirements of specific applications of embodiments of the invention.

Figure 4C:
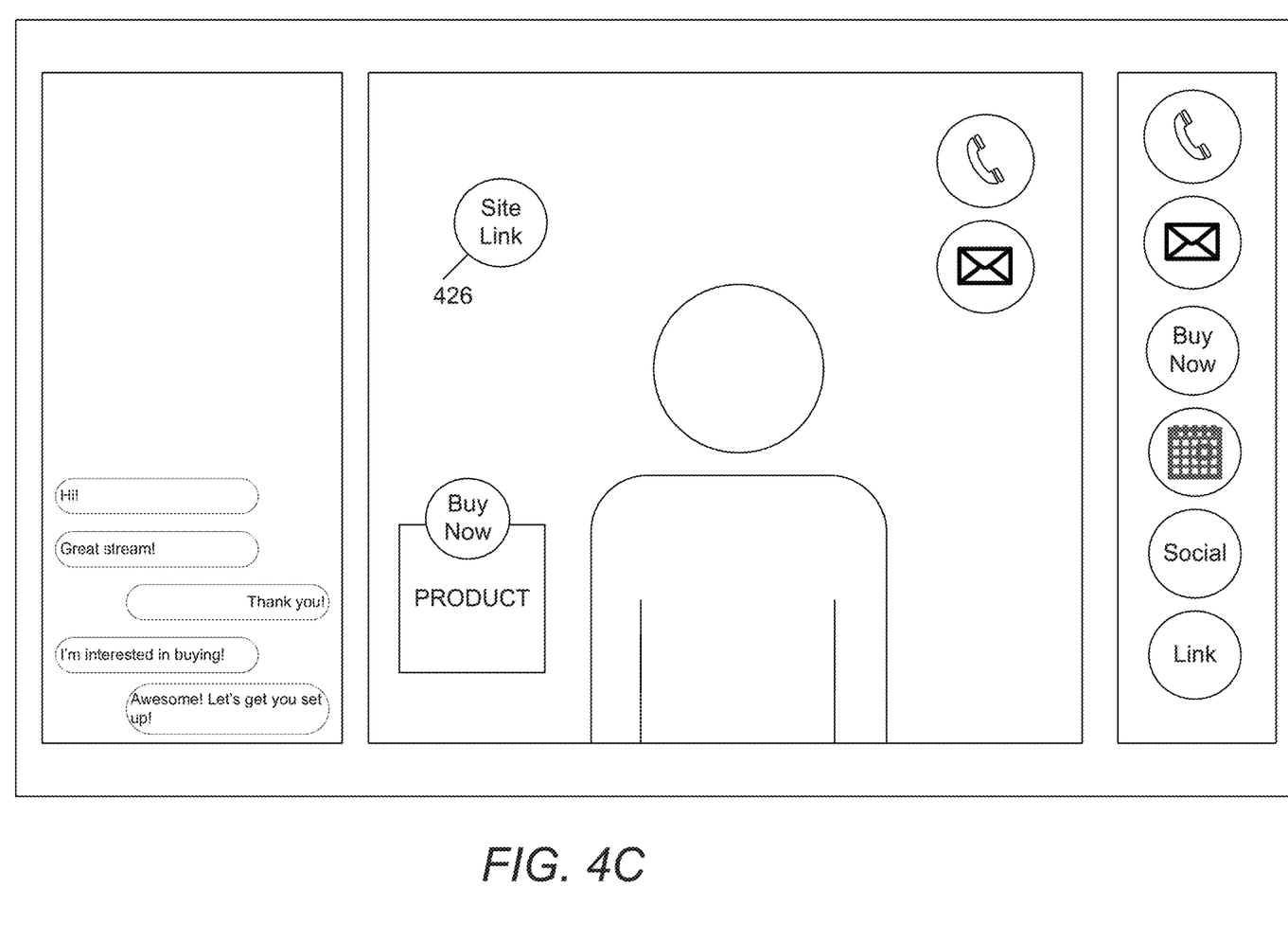

Turning now to FIG. 4C, the interaction encoder interface in accordance with an embodiment of the invention is again illustrated. At this point, the link object 426 has been created and introduced into the stream as an interactable object. As can be readily appreciated, FIGS. 4A-C illustrate only one embodiment of the invention, and any number of different interactions, pane orientations, additional panes, fewer panes, or any other variation can be introduced without departing from the scope or spirit of the invention.

Figure 5A:
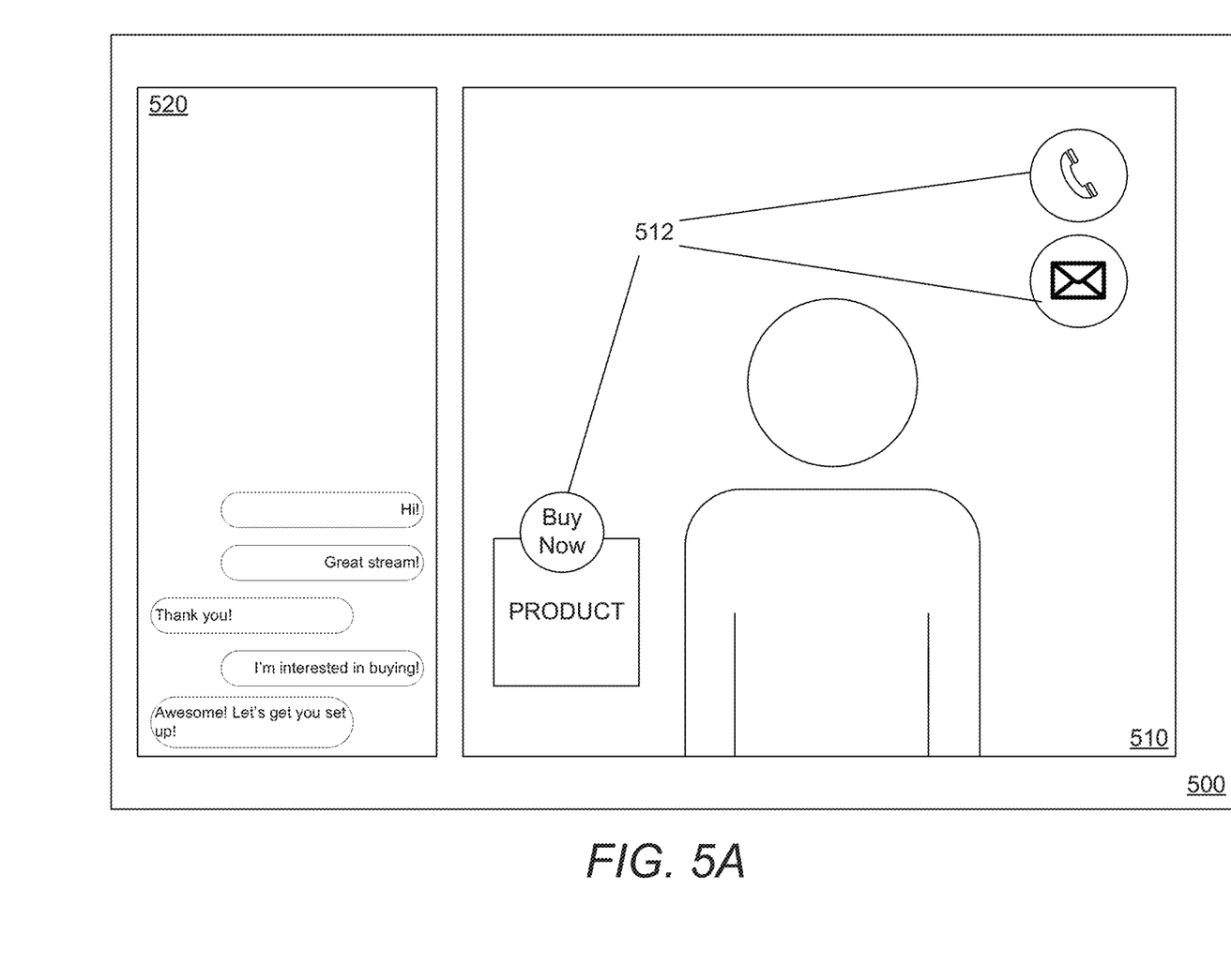
FIGS. 5A-B are example UI diagrams for an interaction decoder in accordance with an embodiment of the invention.

The interactions generated by a host in their interaction encoder interface can be displayed in a viewer's interaction decoder interface. Interaction decoder interfaces can further facilitate functionality triggered by interacting with an interaction object. Turning now to FIG. 5A, an interaction decoder interface in accordance with an embodiment of the invention is illustrated. Interaction decoder interface 500 includes a media pane 510 and a chat pane 520. In numerous embodiments, chat panes are not present, and/or other panes may be added. In the illustrated embodiment, the media pane is displaying a person selling a product. Three interaction objects 512 have been placed in the media pane. A viewer may click (or otherwise select depending on input methodologies) an interactable object to trigger it's associated interactive functionality.

Figure 5B:
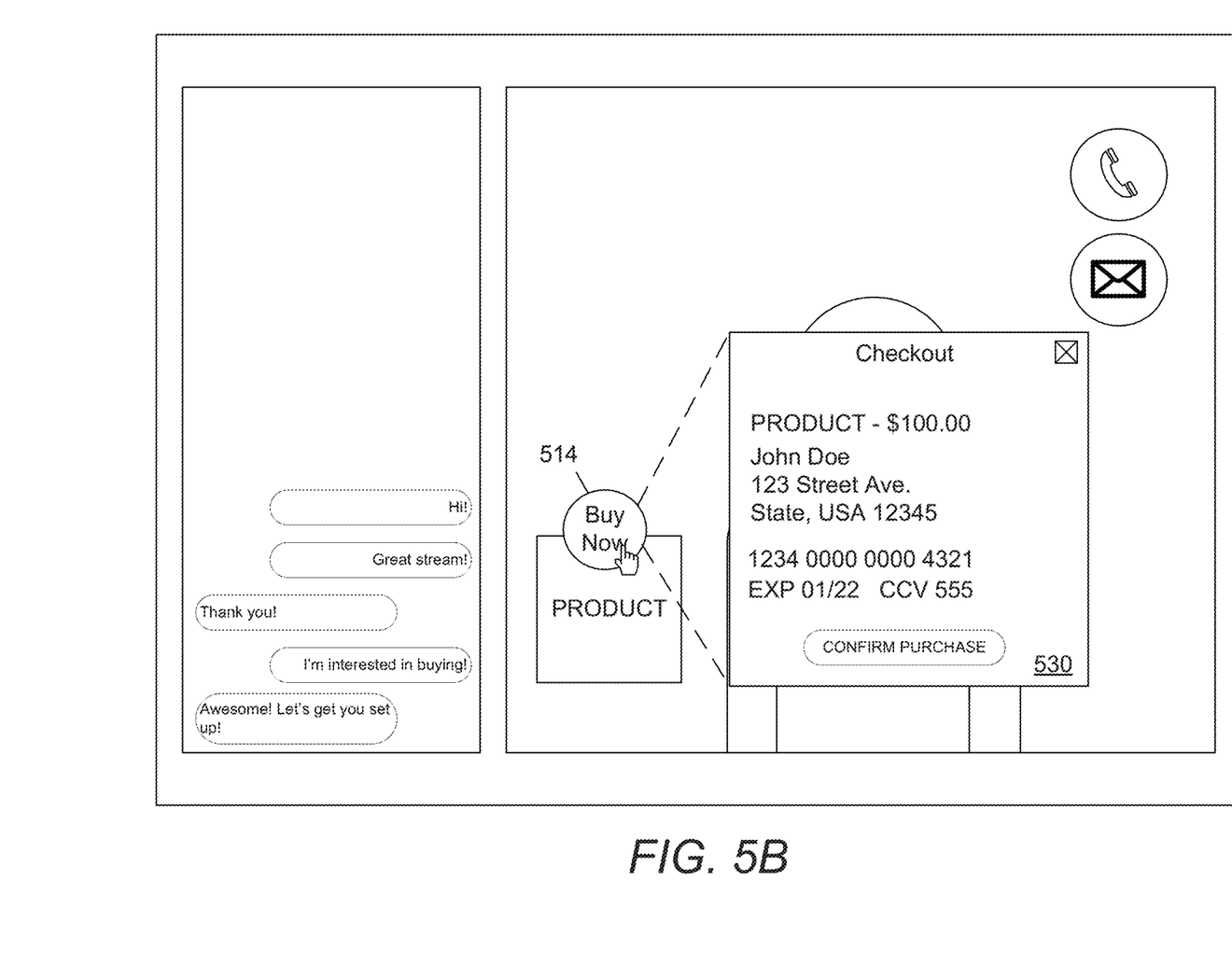

By way of example, turning now to FIG. 5B, the interaction decoder interface where the Buy Now object is selected in accordance with an embodiment of the invention is illustrated. By selecting the Buy Now object 514, a purchase pane 530 is displayed within the media pane. In many embodiments, the purchase pane is added as a pane adjacent to or otherwise within the interaction decoder interface not overlaying the media pane. In many embodiments, the purchase pane includes functionality enabling the viewer to directly purchase a product (e.g. the product being sold by the host). In numerous embodiments, the purchase pane is automatically populated using the API of a ecommerce platform that is selling the product. The purchase pane can include the product details and price, as well as provide payment methods like credit card payment forms and shipping/billing addresses. Indeed, any number of different purchase options can be included in the purchase pane as appropriate to the requirements of specific applications of embodiments of the invention.

As can be readily appreciated, any arbitrary type of interaction can be added to either interface, any of which can open new panes or trigger other effects within the interface. Indeed, while particular interfaces are illustrated in FIGS. 4A-C, and 5A-B, any number of different interface designs can be used while maintaining functionality. Thus, the shown interfaces should be considered illustrative and not restrictive. Processes for encoding and decoding interaction data are discussed below.

Interaction Encoding and Decoding Processes

At a high level, interaction encoding refers to processes by which a host can select interactions to introduce into a media stream, and the packaging of data which enables said interactions to be rendered in the media stream at a decoder. Following, interaction decoding at a high level refers to processes by which an interaction decoder can receive a media stream with interaction data, the rendering of the media stream and associated interaction objects, and the handling of a viewer's arbitrary selection of any of the provided interactions. Interaction encoding and decoding processes can include additional functionality such as the storage for later playback of media streams and associated interactions, and recording interaction objects created and viewer's interactions with said interaction objects for later usage (e.g. as part of a CRM system). In many embodiments, interaction encoding and decoding processes can be part of a larger sales network and/or system, and may record additional information such as attribution information (i.e. salespeople associated with bringing a viewer to a particular stream). For example, in numerous embodiments, referral links that have embedded referral codes can direct a consumer to the interactive live stream while also enabling the tracking of the referral source of the link.

Figure 6:
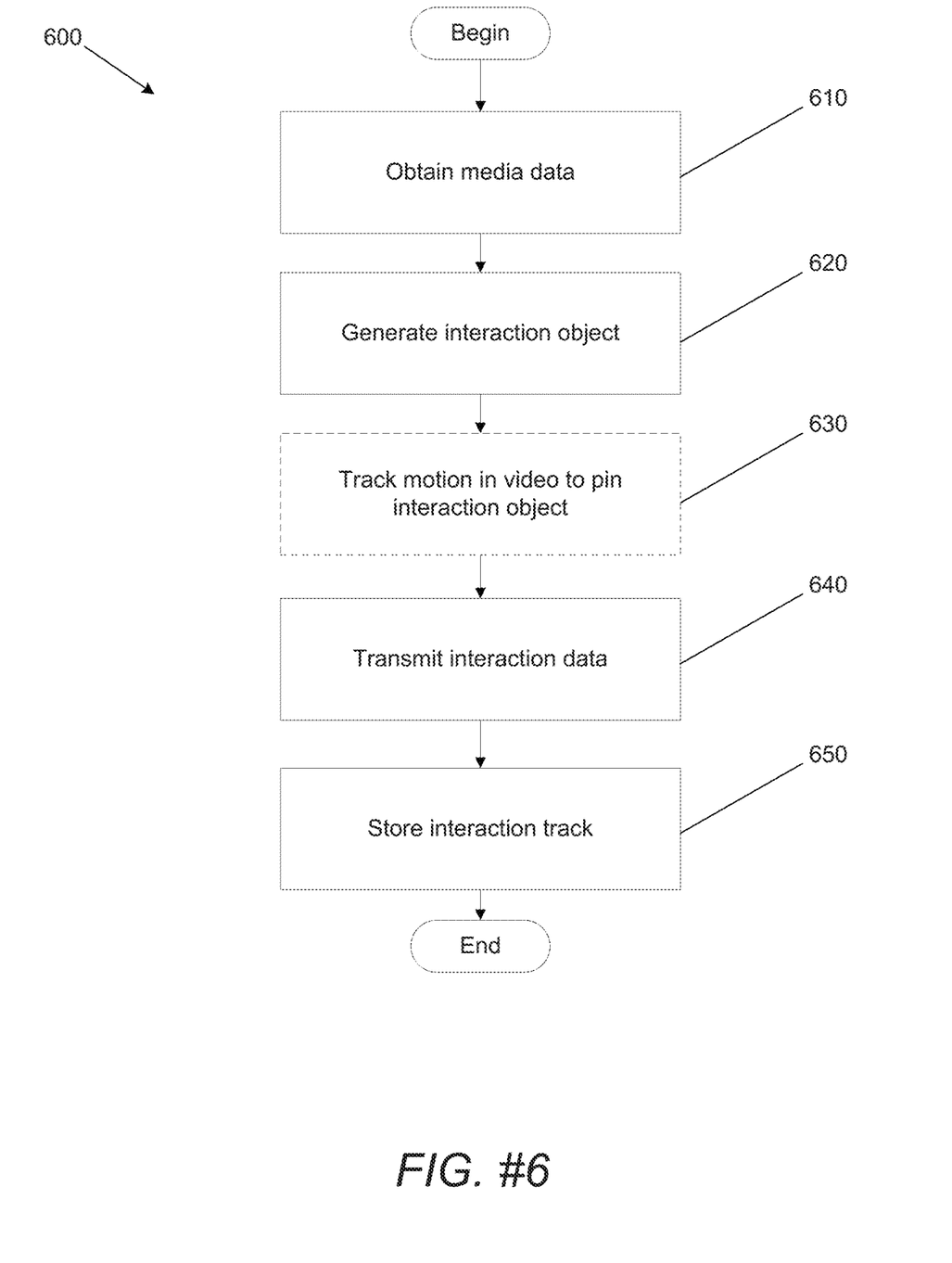
FIG. 6 is a flow chart for an interaction encoding process in accordance with an embodiment of the invention.
Figure 7:
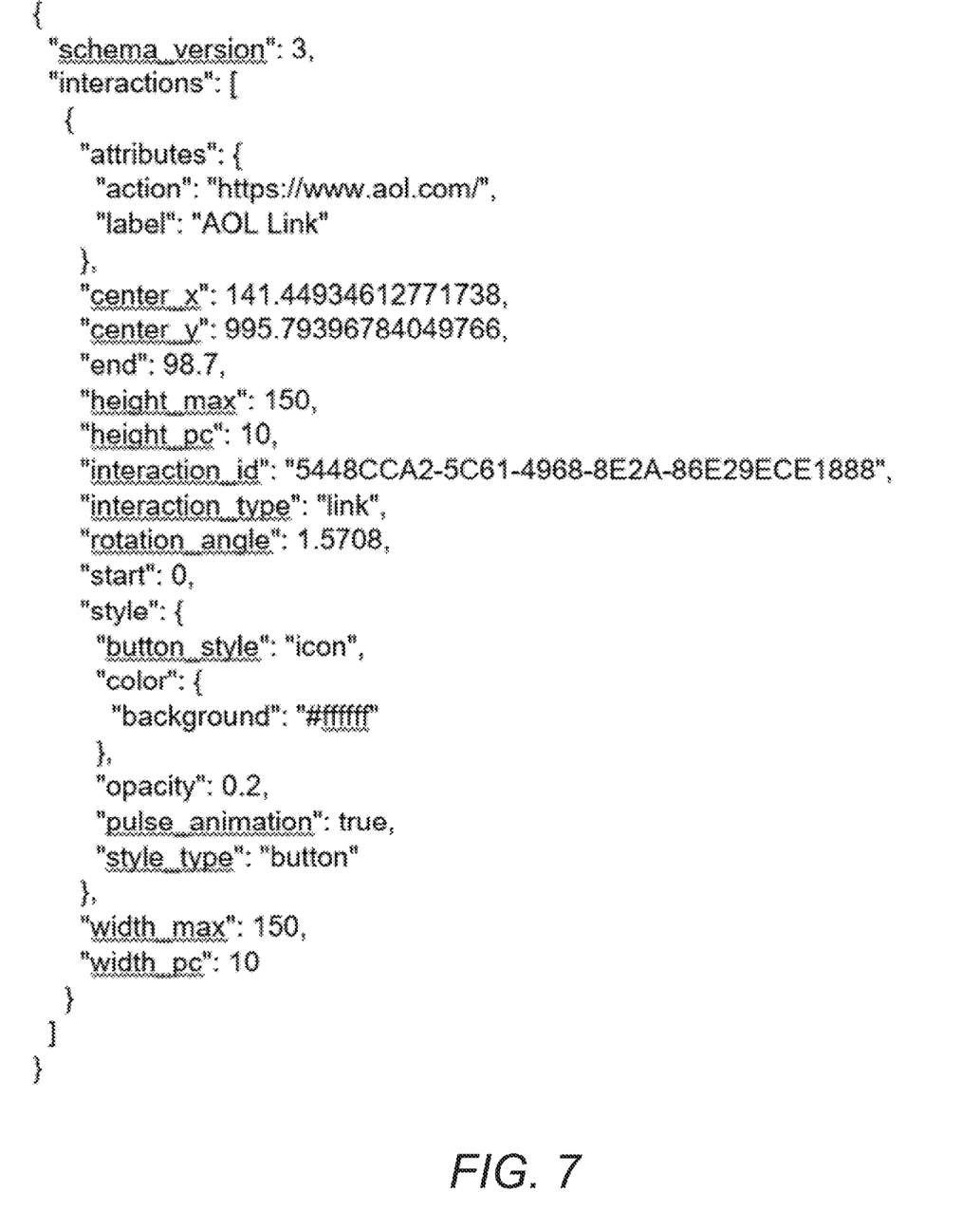
FIG. 7 is an example interaction object structure in accordance with an embodiment of the invention.

Turning now to FIG. 6, an interaction encoding process in accordance with an embodiment of the invention is illustrated. Process 600 includes obtaining (610) media data. In many embodiments, the media data consists of audio and video tracks. However, either one can be present without the other. In various embodiments, the media data is a live recording happening in near real-time. Process 600 further includes generating an interaction object. In many embodiments, the interaction object is generated in response to a host selecting an interaction object and inputting specific parameters for said object. In various embodiments, the interaction object is selected from a set of template interactions in an interaction library. In numerous embodiments, the interaction object is stored as a JSON object. An example link interaction object in accordance with an embodiment of the invention is illustrated in FIG. 7. However, as can be readily appreciated, any number of different languages can be similarly used to store information.

In numerous embodiments, motion in the media data is tracked (630) to enable pinning the interaction object to a particular tracked object in the scene. Interaction objects are transmitted (640) as interaction data. In many embodiments, the interaction data is transmitted using a pub/sub (or "push") architecture on a WebSocket transport. However, any number of different protocols can be used to transmit interaction data. In numerous embodiments, interaction objects have a static location, and their movement is triggered by sending an updated interaction object with the same interaction identifier with a new set of coordinates. In this way, interaction data streamed over time may include multiple sequential versions of the same interaction object with updated parameters. Interaction data can further include commands to delete an interaction object with a particular interaction ID.

The interaction data can be stored and/or transmitted as an interaction track, similar to a video track or audio track, for later playback. In numerous embodiments, interaction data can be added to a manifest along with an audio and/or video track in a streaming system such as, but not limited to, those found in adaptive streaming systems. In various embodiments, interaction encoding processes further include transmitting the media data, although in some embodiments, the media data can be transmitted by a separate piece of computing hardware. For example, in a production environment, one machine may be used to stream the audio and video and another may be used to stream the interaction data. However, in various embodiments, a single interaction encoder can stream both the media data and interaction data.

Figure 8:
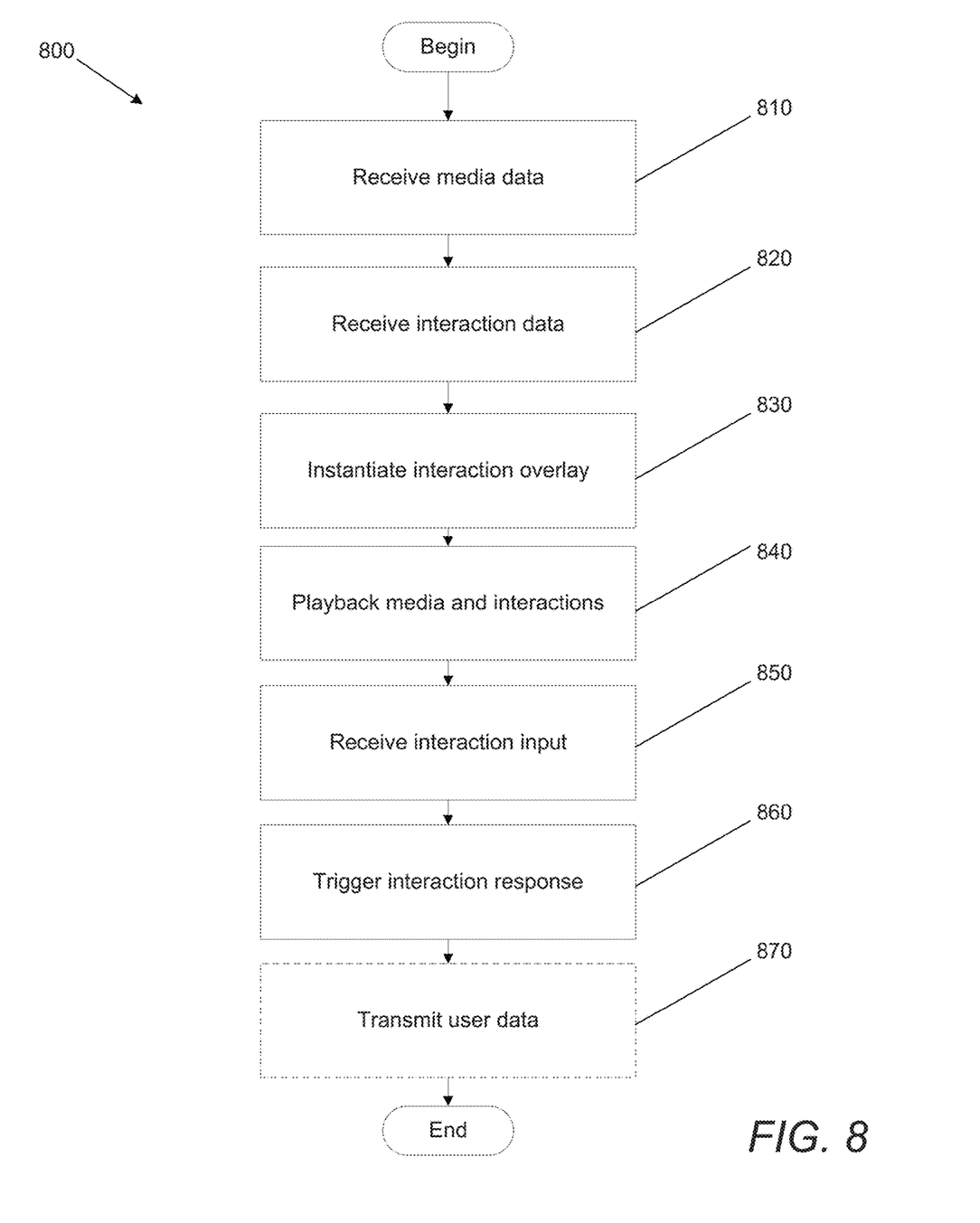
FIG. 8 is a flow chart for an interaction decoding process in accordance with an embodiment of the invention.

Turning now to FIG. 8, an interaction decoding process in accordance with an embodiment of the invention is illustrated. Process 800 includes receiving (810) media data and receiving (820) interaction data. In various embodiments, the interaction data is received via a WebSocket transport to subscribe to a host broadcast channel for updates in near real-time, and the media player is instantiated using WebRTC. However, any number of different transport architectures can be used as appropriate to the requirements of specific applications of embodiments of the invention. An interaction overlay is instantiated (830) over a media player to create a media pane. In numerous embodiments, the media player and interaction overlay can be instantiated using HTML5 and/or JavaScript, although any number of different programming languages can be used as appropriate to the requirements of specific applications of embodiments of the invention. The media data is played back (840) using the media player and the interactions are played back (840) using the interaction overlay. In many embodiments, the interaction overlay and media player are synchronized such that interaction objects are rendered in the interaction overlay at the same timestamp that they were placed into the media pane in the interaction decoder. In numerous embodiments, the media pane appears to a viewer as if the interactions in the interaction overlay are inside the media player (i.e. the interaction overlay is completely transparent but for the interaction objects). The interaction overlay can be made such that it is always the same size as the media player, so that the media pane remains cohesive despite any resizing.

Process 800 further includes receiving (850) interaction input. Interaction input is any interaction by a viewer with an interaction object. An interaction response is triggered (860) by the interaction input, whereby the appropriate interaction is provided to the user. User data recording the nature of the interaction and any other pertinent data can be transmitted 870 to the interaction encoder, a CRM system, and/or any other data collection service as appropriate to the requirements of specific applications of embodiments of the invention.

Although systems and methods for interactive live video streaming are discussed above, many different architectures and methods can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An interaction encoder for transmitting interactive live video streams, comprising:
a processor; and
a memory, containing an interaction encoding application, where the interaction encoding application directs the processor to:
obtain media data comprising a video track;
receive a request to generate an interaction object in the video track at a given timestamp of the video stream;
generate the interaction object based on the request, wherein the interaction object comprises a data structure capable of being decoded in near-real time to produce the interaction object in the video track at the timestamp when played back;
store the interaction object in an interaction track;
generate a single manifest describing a location of the interaction track and a location of the video track;
transmit the manifest to a media player; and
transmit the interaction track and the video track from their respective locations to media player in response to a request based on the manifest, where the media player comprises an interaction decoder capable of decoding the interaction track to render the video track overlaid with the interaction object.

2. The interaction encoder of claim 1, wherein the media data further comprises an audio track, the manifest further describes a location of the audio track; and the interaction encoding application further transmits the audio track from the location of the audio track to the media player in response to the request.

3. The interaction encoder of claim 1, wherein the interaction encoding application further directs the processor to provide an interaction user interface, where the interaction user interface comprises an interaction pane, and where the interaction pane comprises a plurality of selectable buttons which, when pressed, generate the request to generate an interaction object.

4. The interaction encoder of claim 1, wherein the data structure is a JavaScript Object Notation (JSON) object comprising variables describing at least coordinates of the interaction object, a timestamp at which to render the interaction object, and a link to be executed by a web browser when the interaction object is interacted with.

5. The interaction encoder of claim 1, wherein the interaction encoding application further directs the processor to:
track the motion of an object in the video track; and
update the interaction data to reflect the tracked motion such that a location of the interaction object follows the tracked motion to create a pin effect.

6. An interaction decoder for displaying interactive live video streams, comprising:
a processor; and
a memory, comprising an interaction decoding application, where the interaction decoding application directs the processor to:
receive a manifest from an interaction encoder, where the manifest describes the location of an interaction track and a location of a video track, and where the interaction track comprises at least one interaction object comprising a data structure capable of being decoded in near-real time by the interaction decoder to produce the interaction object in the video track at a given timestamp;
request the interaction track using the location of the interaction track;
request the video track using the location of the video track;
receive the interaction track and the video track in response to the requests;
render the video track using a video player;

generate an interaction pane, where the interaction pane is transparent and overlays the video player;

render the interaction object in the interaction pane using the data structure at a time and location indicated by the data structure; and displaying, in response to selection of the interactable object, an interaction effect indicated by the data structure.

7. The interaction decoder of claim 6, wherein the interaction effect is selected from the group consisting of: a phone call effect, an email effect, a buy now effect, a schedule effect, a social effect, and a link effect.

8. The interaction decoder of claim 6, wherein the interaction decoding application further configures the processor to move the interaction object in the interaction pane based on reception of new interaction data.

9. The interaction decoder of claim 6, wherein the interaction effect is a buy now effect, and the interaction decoding application further directs the processor to request a purchasing interface via an API from an e-commerce vendor.

10. The interaction decoder of claim 6, wherein the interaction decoding application further directs the processor to:

record interactions with the interactable object; and transmit the record of the interactions to an interaction encoder.

11. The interaction decoder of claim 10, wherein the interaction decoding application further directs the processor to:

receive a referral code; and transmit the referral code with the record of interactions.

12. The interaction decoder of claim 10, wherein the record of the interactions comprises purchase records.

13. An interactive live streaming video system comprising:

an interaction encoder, where the interaction encoder is configured to:

transmit a live video stream;

receive a request to display an interactive object over the live video stream;

generate the interaction object based on the request, wherein the interaction object comprises a data structure capable of being decoded in near-real time to produce the interaction object in the video track at the timestamp when played back;

store the interaction object in an interaction track;

generate a manifest comprising the locations of the interaction track; a video track of the live video stream; and an audio track of the live video stream; and transmit the manifest; and transmit the manifest to an interaction decoder; and the interaction decoder, where the interaction decoder is configured to:

receive the manifest;

obtain the interaction track, the video track, and the audio track using the manifest;

playback the live video stream in a video player;

generate a transparent interaction pane over the video player; and render the interactive object in the interaction pane such that the interactive object appears to be in the live video stream.

14. The interactive live video streaming system of claim 13, wherein the interaction decoder is further configured to:

record interactions made in the interaction pane; and transmit the recorded interactions to the interaction encoder.

15. The interactive live video streaming system of claim 13, wherein the data object is a JSON object.

16. The interactive live video streaming system of claim 13, wherein the interaction decoder is further configured to:

receive a selection of the interactive object; and display an interaction effect in response to the selection.

17. The interactive live video streaming system of claim 16, wherein the interaction effect is a buy now effect; and the interaction decoder is further configured to:

display a pane for purchasing a product, where the pane for purchasing a product is populated by accessing an API of an e-commerce provider selling the product.

18. The interactive live video streaming system of claim 13, wherein the interaction decoder is further configured to:

receive a referral code; and transmit referral information to the interaction encoder based on the referral code.

19. The interactive live video streaming steaming system of claim 13, wherein the interaction encoder is further configured to:

generate a manifest comprising the locations of the interaction track; a video track of the live video stream; and an audio track of the live video stream; and transmit the manifest; and where the interaction decoder is further configured to;

receive the manifest; and obtain the interaction track, the video track, and the audio track using the manifest.

* * * * *